Sept. 21, 1926.  
A. J. F. WRIGHT  
1,600,448  
SUPPLEMENTAL SPRING FOR VEHICLES  
Filed Dec. 9, 1925

INVENTOR.  
A. J. F. Wright.  
BY J. Edward Maybee  
ATTY.

Patented Sept. 21, 1926.

1,600,448

UNITED STATES PATENT OFFICE.

ALFRED J. F. WRIGHT, OF TORONTO, ONTARIO, CANADA.

SUPPLEMENTAL SPRING FOR VEHICLES.

Application filed December 9, 1925. Serial No. 74,331.

This invention relates to supplemental springs arranged as shock absorbing devices for vehicles, of the type adapted to co-operate with the main springs of the vehicle to prevent excessive reaction of the same and to increase the efficiency of the spring action, and my object is to provide a device of the above character which is simple in construction, which may be readily applied to existing vehicles and which can be manufactured cheaply and yet be durable and efficient.

Figure 5:
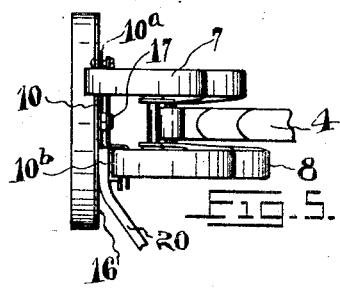
Figure 2:
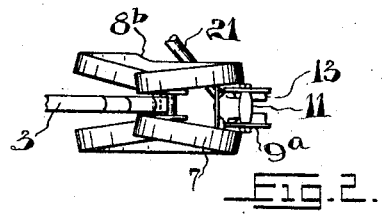
Figure 1:
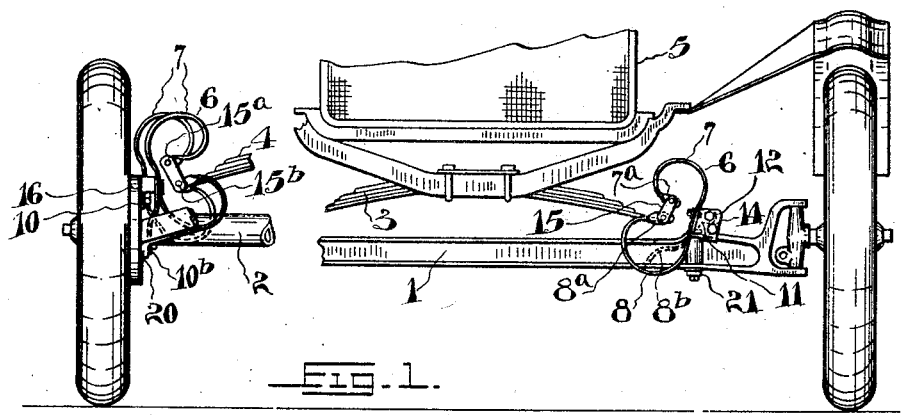
Figure 4:
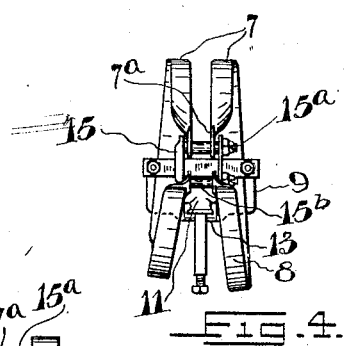
Figure 3:
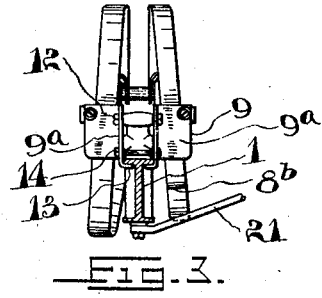
Figure 6:
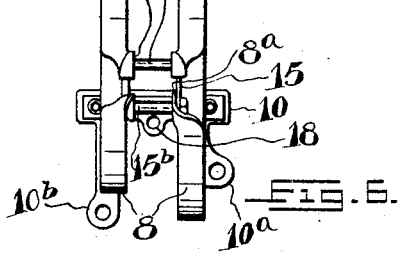

I attain my object by employing C shaped supplemental springs. Two pairs of C shaped springs are connected with each end of each main spring and with the vehicle element which was originally directly connected with the main spring. The constructions are hereinafter more fully described and illustrated in the accompanying drawing in which Fig. 1 is a front elevation of part of an automobile, partly broken away to show a front elevation of the forward and rear main springs with my invention in place thereon;

Fig. 2 a plan view, on an enlarged scale, of the supplemental springs used on the forward main spring;

Fig. 3 a rear view of the same;

Fig. 4 a front view of the same;

Fig. 5 a plan view, on an enlarged scale, of the supplemental springs used on the rear main spring; and Fig. 6 a front view of the same.

In the drawings like numerals of reference indicate corresponding parts in the different figures.

1 is the front axle and 2 the rear axle housing of the vehicle. 3 and 4 are the front and rear main springs and 5 is part of the body of the vehicle.

Each of my improved supplemental springs 6 comprises two pairs of springs located at opposite sides of an axle. One spring of each pair is located above the other spring and the free ends of the four springs are connected by means of a shackle with an end of a main spring. Each pair of the supplemental springs is formed by bending a rectangular cross sectioned strip of spring steel to form oppositely disposed C shaped springs 7 and 8. The free ends 7$^a$ and 8$^a$ of each pair of springs are twisted through an arc of substantially 90° and these twisted ends are provided with holes adapted to receive the legs of a shackle 15 as hereinafter described. The pairs of springs forming a supplemental spring unit are clamped side by side to a transversely arranged supporting member 9 or 10.

The supporting members 9 are detachably connected with the front axle, as follows. The perch 11 carried by the axle and which was originally connected with an end of the front main spring 3 is turned on its axis through an arc of 180°. Each support 9 is formed by a pair of angle brackets 9$^a$ secured by means of a bolt 12 to opposite sides of the perch 11. The brackets are provided with inwardly directed lips 13 adapted to engage the underside of the upper flanges of the I sectioned front axle 1, see Fig. 3. A bolt 14 passed through the brackets is adapted to hold the lips in engagement with the axle which arrangement materially lessens the bending stress on the perch.

The leg 15$^a$ of a shackle 15 is passed through the holes in the free ends 7$^a$ of the upper springs 7 and the other leg 15$^b$ of the shackle is passed through the holes in the ends 8$^a$ of the lower springs 8. The leg 15$^b$ is also passed through an eye on the main spring which lies between the ends 8$^a$ of the supplemental springs.

The supporting members 10 are detachably connected with the brake drum disks 16, carried by the rear axle housing 2, as follows. Heretofore each end of the rear main spring 4 was carried on a perch secured to the disk 16. I now use a bolt instead of this perch and pass it through a hole 18 formed in the member 10. A nut 17 threaded on the bolt holds the member in position. To further secure the member I provide it with depending arms 10$^a$ and 10$^b$, the arm 10$^a$ being provided with a hole to receive the usual band brake pivot cam stud which passes through the disk and has a nut threaded on its outer end. The arm 10$^b$ is formed with an offset so that it will clear the radius or torque arm 20 connected with the disk 16. The arm 10$^b$ is also provided with a hole for receiving one of the bolts or studs for securing the radius arm to the disk.

The lower springs 8 located in the rear of the front axle are bent as indicated at 8$^b$ to clear the front axle radius rods 21. The lower springs 8 in front of the rear axle are also shaped differently than those in the rear thereof, to clear the radius arms 20.

It will be noted that the axes of the lower legs 15$^b$ of the shackles are normally positioned in front of the axes of the upper legs 15$^a$. In other words the shackle is inclined from the vertical towards the upper leg. When the vehicle is loaded the main spring straightens out and swings the shackle towards or slightly past the vertical, which results in the lower springs being acted on first. A further movement of the main springs causes the lower springs to be further compressed and the upper springs to be expanded. Any shock from the road is transmitted to one or both axles, this results in the lower springs being still further compressed and the upper springs being further expanded. Any slight shocks or jars will thus be absorbed by the supplemental springs and if the shock is severe it will result in the main springs being brought into action. In either case the vibrations of each supplemental spring are working against the vibrations of the opposite spring which tends to stop the vibration of the supplemental springs and also the vibration of the main springs. As the lower springs 8 are chiefly used as compression springs they are made longer than the upper springs 7.

When the vehicle is loaded to straighten out the main springs to the point where the shackles 15 are swung to the vertical, the springs 8 act against the ends of the main springs to tend to prevent any tendency of the latter to swing sideways.

What I claim is:

1. In a vehicle spring the combination with a main spring, of a pair of oppositely disposed C shaped supplemental springs formed integral and rigidly supported, intermediate the ends thereof, on a vehicle element; and means for connecting the free ends of the C springs with the main spring.

2. In a vehicle spring, the combination with a main spring, of pairs of oppositely disposed C shaped supplemental springs, the pairs being arranged side by side, each pair having their adjacent ends supported on a vehicle element; and a shackle for connecting the free ends of the C springs with the main spring.

3. In a vehicle spring, the combination with a main spring, of pairs of oppositely disposed C shaped supplemental springs, the pairs being arranged side by side, each pair being formed integral and rigidly supported intermediate their ends on a vehicle element; and a shackle having one leg connecting the corresponding springs of each pair and having its other leg connecting the other corresponding springs and the main spring.

4. A supplemental spring for vehicles comprising a pair of springs arranged one above the other, each spring having its ends adapted for connection with relatively movable parts of a vehicle.

5. In a vehicle spring, the combination with a main spring, of an integral pair of supplemental springs arranged one above the other and supported intermediate their ends on a vehicle element; and means for connecting the free ends of the pair of springs with the main spring.

6. In a vehicle spring, the combination with a main spring, of pairs of oppositely disposed C shaped supplemental springs, the springs of each pair being arranged one above the other and supported intermediate their ends on a vehicle element; and a shackle for connecting the free ends of the lower springs with the free ends of the upper springs and with the main spring.

7. In a vehicle spring, the combination with a main spring, of pairs of oppositely disposed C shaped supplemental springs, the springs of each pair being arranged one above the other and supported intermediate their ends on a vehicle element, the lower springs being longer than the upper springs; and a shackle for connecting the free ends of the lower springs with the free ends of the upper springs and with the main spring.

8. In a vehicle spring, the combination with a main spring, of pairs of oppositely disposed C shaped supplemental springs, the springs of each pair being arranged one above the other and supported intermediate their ends on a vehicle element; and a shackle having one leg connecting the upper springs of each pair and having its other leg connecting the lower springs and the main spring, the axis of the lower leg being normally positioned in front of the axis of the upper leg whereby the shackle is swung towards the vertical and the lower spring is acted on first when the initial load is applied to the main spring.

9. In a vehicle spring, the combination with a main spring, of pairs of oppositely disposed C shaped supplemental springs, the springs of each pair being arranged one above the other and supported intermediate their ends on a vehicle element, the lower springs being longer than the upper springs; and a shackle having one leg connecting the upper springs of each pair and having its other leg connecting the lower springs and the main spring, the axis of the lower leg being normally positioned in front of the axis of the upper leg whereby the shackle is swung towards the vertical and the lower spring is acted on first when the main spring is straightened out.

10. In a vehicle spring, the combination with a main spring, of pairs of oppositely disposed C shaped supplemental springs, the springs of each pair being arranged one above the other and formed of a rectangular cross sectional strip having the portion between the springs supported on a vehicle element, the free ends of the spring strips being twisted through an arc of substantially 90° and provided with holes; and a shackle having one leg passed through the holes of corresponding springs of each pair and having its other leg passed through the holes of the other corresponding springs and through an eye on the main spring.

11. In a vehicle spring, the combination with a main spring, of two C shaped supplemental springs supported at opposite ends of a vehicle element and having their free ends connected with the opposite ends of the main spring; and spring means tending to prevent the main spring from swinging sideways.

12. In a vehicle spring, the combination with a main spring, of two C shaped supplemental springs rigidly supported at opposite ends of a vehicle element; and shackles, each having one end pivotally connected with one end of the main spring and the other end pivotally connected with the free end of the adjacent supplemental spring.

13. In a vehicle spring, the combination with a main spring, of two C shaped supplemental springs rigidly supported at opposite ends of a vehicle element; shackles for connecting the free ends of the supplemental springs with the adjacent ends of the main spring; and resilient means tending to prevent the shackles from swinging sideways.

Signed at Toronto, Canada, this 26th day of November, 1925.

ALFRED J. F. WRIGHT.